Aug. 5, 1958     W. STANEK     2,845,898

WRITING INSTRUMENT CHUCK

Filed June 27, 1955

INVENTOR:

Walter Stanek

By *Eric D. Frankel*

Patent Agent

# United States Patent Office 2,845,898
Patented Aug. 5, 1958

2,845,898

WRITING INSTRUMENT CHUCK

Walter Stanek, Schwabach, Germany, assignor to A. W. Faber-Castell, Nurnberg, Germany Application June 27, 1955, Serial No. 518,250

11 Claims. (Cl. 120—21)

This invention relates to a chuck for holding a filler of lead or other material in a mechanical or propelling pencil at the front end or tip thereof, and to a method of making such a chuck.

The prior art chucks of such mechanical pencils, especially of pencils with fillers of a thickness or diameter requiring occasional sharpening have on the inside sharp-edged grooves holding the filler firmly. These grooves have been arranged either annularly or helically in the form of screw threads. It has been found that such grooves or screw threads alone do not prevent the fillers from rotating, with the result that during the sharpening of the fillers by means of pencil sharpeners, the fillers tend to rotate within the chucks, making sharpening impossible.

To overcome this difficulty, it has been proposed to provide intersecting right and left screw threads on the inside of the chuck. The manufacture of pencils with such right and left threads presents considerable difficulties. Moreover, a large amount of material has to be removed from the interior wall of the chuck for the right and left threads, so that the filler will be held at a few points only, which is undesirable.

Furthermore, it has been proposed to provide a flat channel or groove in the center of the jaws of the chuck, in order to assure a better grip. Such construction has the drawback that the ridges or screw threads tend to act as threading dies so that the filler will be turned and threaded, rather than prevented from turning.

It is an object of the invention to overcome these difficulties by providing a chuck which will assure a firm grip on the filler.

It is a further object of the invention to provide in a mechanical pencil a chuck or holder member with interior grooves or screw threads and to interrupt or mutilate these grooves or screw threads along lines or narrow zones which are substantially parallel to the center axis of the chuck or holder member by mashing the ridges of these grooves or screw threads downwardly toward or to their roots. A chuck with such interruptions of the interior grooves or screw threads is adapted to firmly hold the filler, because the ridges do not present sharp cutting edges at the interruptions which would act as threading dies as in the prior-art development mentioned in the foregoing.

It is a still further object of this invention to provide these interruptions either in the center of each of the jaws of the chuck or on the side edges of the individual jaws.

It is another object of the present invention to provide a suitable method for producing a chuck of the type described above.

These and other objects and advantageous features of the invention will be apparent from the following detailed description and drawing, appended thereto, wherein merely for the purposes of disclosure non-limitative embodiments of the invention are set forth.

In the drawing, Fig. 1 is a side view of a chuck or holder according to the invention with its jaw members spread or opened to show the inner details of its construction.

Figure 1:
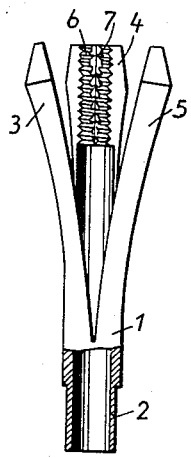
Figure 2:
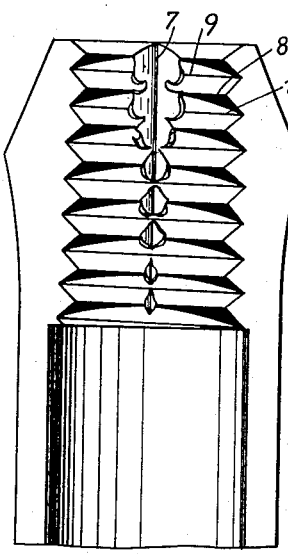
Fig. 2 is an enlarged view of one of the jaws shown in Fig. 1, said jaw having a central interruption of the screw threads to prevent a filler to be inserted in the chuck from being turned.

In Fig. 1 of the drawing, a chuck or holding member 1 is provided at the front end or tip of a mechanical pencil not shown. This chuck or holding member 1 is longitudinally and partially slit from the front end or tip, whereby three substantially identical jaw parts 3, 4 and 5 are obtained which are joined at the rear end 2 of this chuck or holding member 1. The jaw parts 3, 4 and 5 are provided at their inner walls with grooves, for example, screw threads 6, as best shown in Fig. 2. The screw threads 6 are mutilated or interrupted in the center of each of the jaws at 7 along lines substantially parallel with respect to the axis of the chuck member 1 by mashing the ridges 8 of these threads toward their roots 10. The screw threads 6 are mashed to a greater extent at the tip or free end of the chuck or holder member 1, i. e., the mutilations are tapered, beginning with slight depressions at the thread end which is remote from the free end of the chuck or holder member 1. As a result of this tapering of the depressions, the clamping force of the jaw parts is greater close to the writing tip, i. e., at the place where the force tending to turn the filler is greatest when the latter is being sharpened.

The foremost depressions at the tip or free end of the chuck or holder member 1 are prepared in such a way that no depressed material projects disturbingly from the front or free end of this chuck or holder member.

Figure 3:
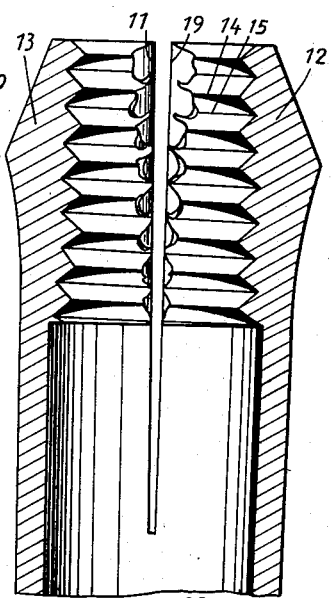
Fig. 3 is a longitudinal section through two jaws of a chuck of another embodiment of this invention, adjacent edges of these two jaws being chamfered to provide interruptions or mutilations of the screw threads for the same purpose as the central interruption in Fig. 2.

In the embodiment of Fig. 3 the interruptions of the screw thread are provided at opposite edges 19 and 11 of jaw parts 12 and 13, respectively, where these edges are chamfered, for example, by mashing the material of ridge 14 into groove 15.

Figure 4:
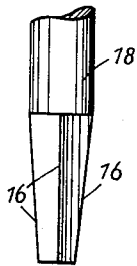
Fig. 4 shows a side view of a punch for mutilating the ridges of the screw threads in a chuck according to the invention.

The grooves or screw threads in the chuck or holder member can be mutilated or interrupted according to this invention, by driving a punch 18, shown in Fig. 4, into the front end opening of the chuck member. This punch 18 has a lower or tool end with tapered edges 16 corresponding to the number of jaws of the chuck member and/or to the number of rows of interruptions to be punched. It is possible to provide more than one row of interruptions in each of the jaws, for example, by mutilating the screw threads or grooves in the center and at the edges of each of the jaws. In such cases, a correspondingly larger number of tapered edges 16 should be provided on the punch 18. As a result of the tapered shape of the edges 16 more material at the ridges close to the writing tip of the pencil is displaced, than at the ridges farther away from the writing point, when the tool end of the punch 18 is driven into the open end of the chuck member. In this manner the tapering of the depressions is obtained. The advantages of this arrangement have been mentioned in the foregoing.

The tool end of the punch 18 can be driven into the chuck 1 before the jaws 3, 4 and 5 are formed by slitting.

Figure 5:
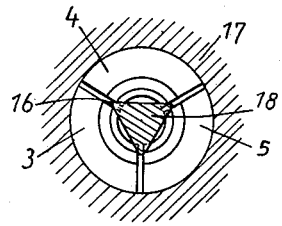
Fig. 5 represents an end view of the jaws of the inventive chuck, held together in a clamp with the end portion, shown in cross section, of the punch of Fig. 4 driven into the opening between the jaws when preparing the interruptions or mutilations according to the invention.

It is also possible to carry out the punching step after the slitting operation. In that case, the chuck has to be held in a tight casing or clamp 17, as shown in Fig. 5, during the punching operation, in order to prevent spreading of the jaws. Fig. 5 illustrates the position of the tool end of the punch 18 when it is driven in and between the jaws 3, 4 and 5, with the three edges 16 of the tool end positioned at the slits, i. e. between opposite edges of adjacent jaws and the casing or clamp 17 enclosing and holding these jaws firmly.

It is to be understood that the term filler as used in this description includes any kind of writing material, such as crayon, chalk or pencil lead of any color, shape or size. The fillers may be held in the chuck 1 in a manner shown in Fig. 6. The chuck 1 is provided with a thread 20 at its rear end 2. With this end the chuck 1 is screwed into a tube 21 which, at its lower end, has an annular projection 22. The tube 21 is inserted into a case 23 having the shape of a pencil and being provided with a sleeve 24 at its upper end. The case 21 is surrounded by a screw spring 25 which with the one end engages the annular projection 22 of the case 21 and with the other end engages the annular edge 26 of the case 23. A push-button 27 is arranged at the lower end of the tube 21. The upper end of the case 23 is provided with a tapered sleeve 28 which is screwed upon the sleeve 24.

Figure 6:
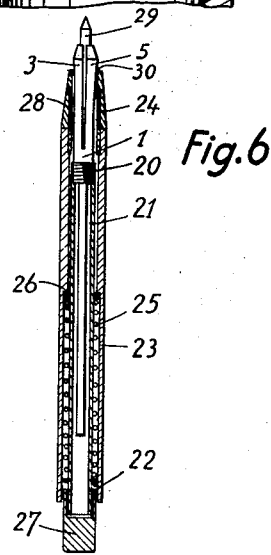
Fig. 6 is a longitudinal section through a mechanical pencil with a chuck according to the invention.

In the position shown in Fig. 6 the pencil filler 29 is clamped in the chuck 1. On pressing the push-button 27 into the case 23, the tube 21 is displaced upwards against the tension of the spring 25, and thereby also the chuck 1, so that the jaws 3, 4 and 5 elastically spread and approximately take the position of Fig. 1. The filler 29 now may be either drawn out or displaced. When the push-button 27 is released, the spring 25 is pressing the chuck 1 into the tapered sleeve 28, the front edge 30 of which is pressing the jaws 3, 4 and 5 together, thus firmly clamping the filler 29.

Although in accordance with the provisions of the patent statutes this invention is described as embodied in concrete forms and the principle of the invention has been explained together with the best modes in which it is now contemplated applying that principle, it will be understood that the elements and combinations shown and described are merely illustrative and that the invention is not limited thereto, since alterations and modifications will readily suggest themselves to persons skilled in the art without departing from the true spirit of the invention or from the scope of the annexed claims.

I claim:

1. In a chuck for holding a filler of a pencil, a tubular clamping member, the front portion of said member being formed with slots dividing said portion into a plurality of jaws, said slots running substantially in longitudinal direction with respect to said member, a plurality of grooves with ribs therebetween formed on the inner wall of said front portion and being disposed substantially at a right angle with respect to the axis of said member, said ribs being pressed down toward said grooves along at least one row substantially parallel to said axis in such a way that material displaced from said ribs is partially filling said grooves at said rows.

2. In a chuck according to claim 1, said ribs and grooves being screw threads.

3. In a chuck according to claim 1, each of said jaws having one of said rows of pressed-down ribs in the center of said jaws.

4. In a chuck according to claim 1, each of said jaws having said rows of pressed-down ribs at their side edges.

5. In a chuck according to claim 1, said rows of pressed-down ribs forming narrow strips.

6. In a chuck according to claim 1, wherein said rows of pressed-down ribs are tapered providing ribs with deeper mutilation at the free end of said chuck than at the opposite end thereof.

7. In a chuck according to claim 1, said ribs at the free end of said chuck being pressed-down inwardly toward said chuck.

8. In a chuck according to claim 1, said slots being equally spaced apart to obtain said jaws in equal width.

9. In a chuck according to claim 1, wherein a plurality of said pressed-down rows are provided and wherein said rows are equally spaced.

10. In a chuck according to claim 1, wherein the number of said rows is the same as the number of said jaws.

11. In a chuck according to claim 1, wherein the number of said rows is a multiple of the number of said jaws.

References Cited in the file of this patent

UNITED STATES PATENTS

| 1,854,825 | Connell | Apr. 19, 1932 |
| 1,908,491 | Steiger | May 9, 1933 |
| 2,105,618 | Silva | Jan. 18, 1938 |
| 2,262,649 | Ponath | Nov. 11, 1941 |

FOREIGN PATENTS

| 852,052 | Germany | Oct. 9, 1952 |